United States Patent [19]

Ragaly

[11] Patent Number: 4,463,275
[45] Date of Patent: Jul. 31, 1984

[54] THREE-PHASE ALTERNATOR WITH A POSITIVE NON-FLEXIBLY COUPLED FAN WHEEL

[75] Inventor: Istvan Ragaly, Schwieberdingen, Fed. Rep. of Germany

[73] Assignee: Robert Bosch GmbH, Stuttgart, Fed. Rep. of Germany

[21] Appl. No.: 416,592

[22] Filed: Sep. 9, 1982

[30] Foreign Application Priority Data

Feb. 18, 1982 [DE] Fed. Rep. of Germany ....... 3205757

[51] Int. Cl.³ .......................... H02K 7/10; F16D 7/02
[52] U.S. Cl. ........................................ 310/78; 192/52; 310/68 D; 464/46
[58] Field of Search .......... 308/189 R; 310/78, 68 D, 310/9 D; 464/46, 178; 123/41.12, 49; 192/52, 55, 56 R; 70.27

[56] References Cited

U.S. PATENT DOCUMENTS 4,095,685 6/1977 McDonald ............... 192/111 B
4,397,380 8/1983 Yew ........................... 192/84 C

FOREIGN PATENT DOCUMENTS 2060713 6/1972 Fed. Rep. of Germany ........ 464/46
2942737 of 1981 Fed. Rep. of Germany .

Primary Examiner—J. D. Miller
Assistant Examiner—D. L. Rebsch
Attorney, Agent, or Firm—Frishauf, Holtz, Goodman & Woodward

[57] ABSTRACT

A three-phase alternator having a fan wheel (23) mounted with ball bearing (17) on the rotor shaft (18,21). The fan wheel, which is free to rotate about the rotor shaft, is coupled to it by a coupling between the V-belt pulley (22) and the fan wheel, which employs a few spaced ball bearings (24,25,26;27,28,29) and support a spring washer (32,36,39,40) which presses against outer races of the bearings and the fan wheel.

9 Claims, 9 Drawing Figures

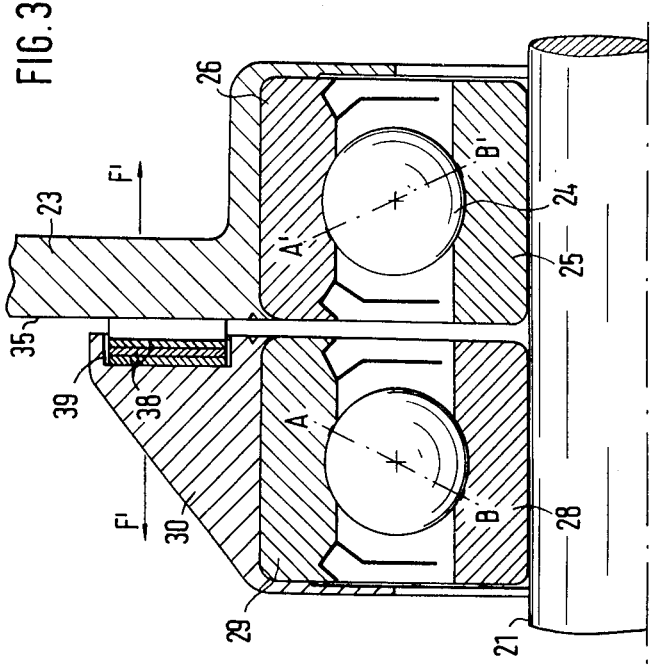
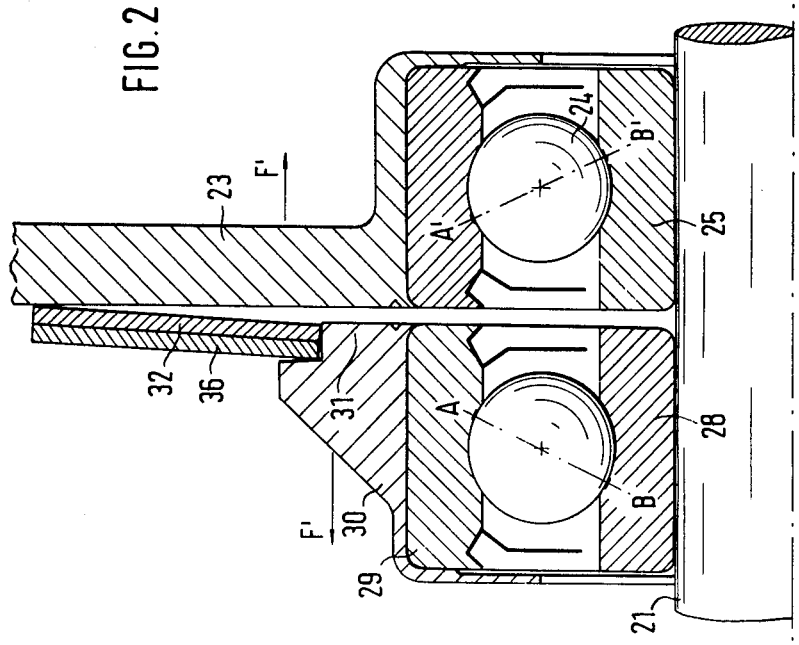

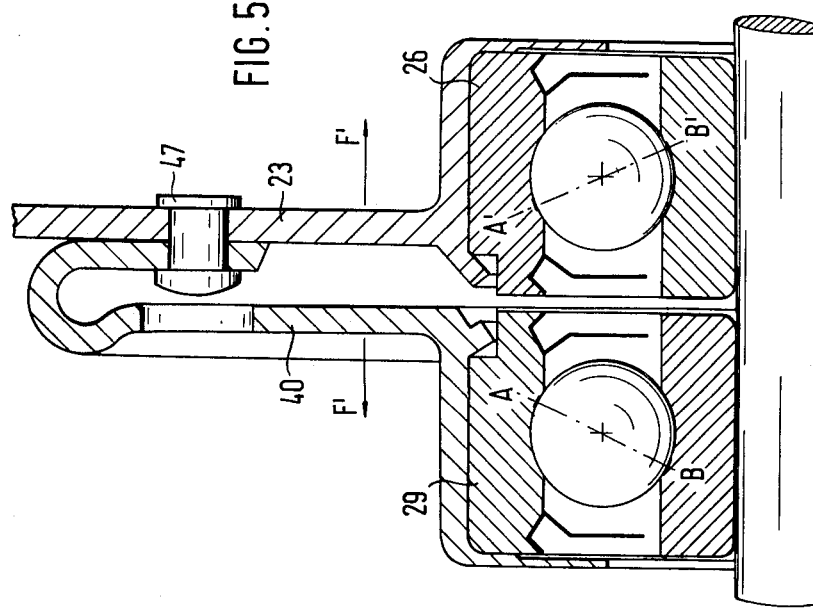
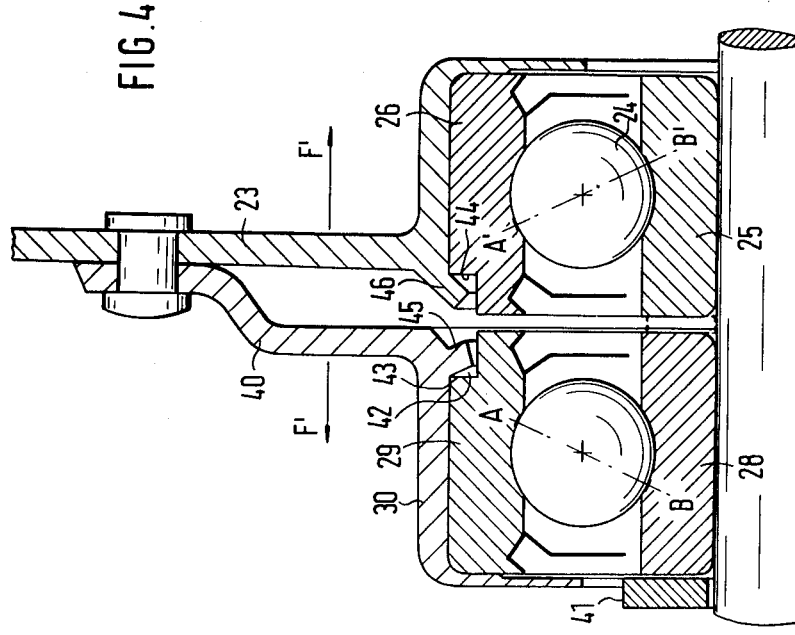

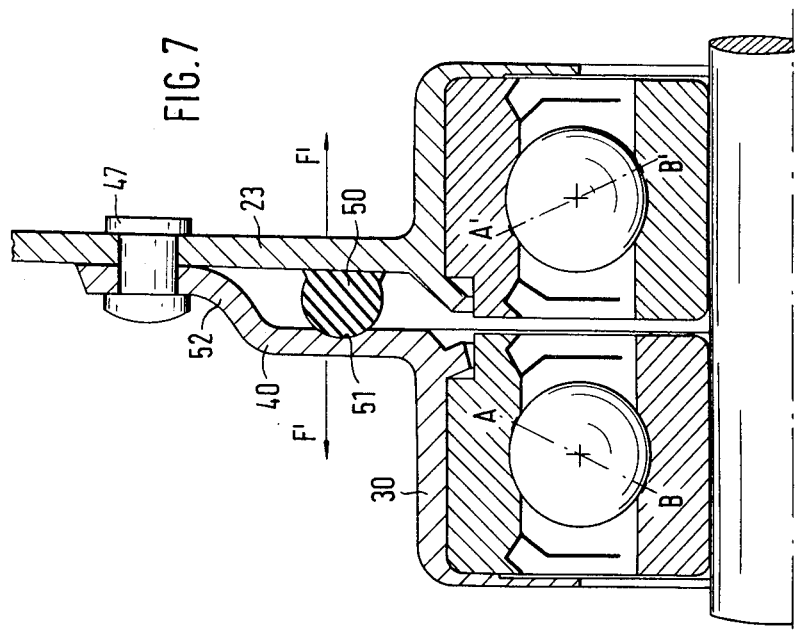
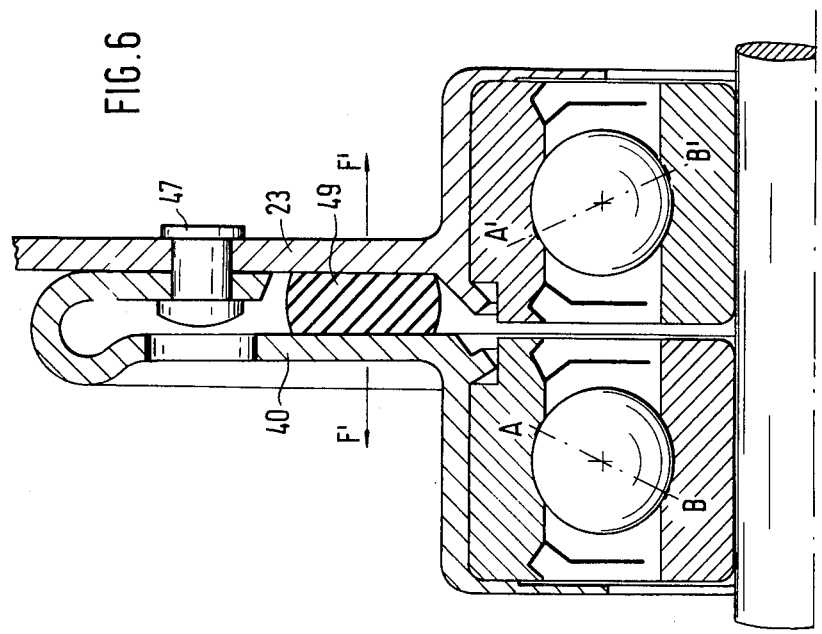

THREE-PHASE ALTERNATOR WITH A POSITIVE NON-FLEXIBLY COUPLED FAN WHEEL

The present invention relates to an alternator, and more particularly to a three-phase alternator driven by an internal combustion (IC) engine by means of a belt pulley which has a fan wheel.

BACKGROUND

An alternator of this type is known from U.S. application Ser. No. 198,967, filed Oct. 20, 1980, now U.S. Pat. No. 4,437,846 by the inventor hereof, assigned to the assignee of this application to which the German patent disclosure document DE-OS No. 29 42 737 corresponds. In the alternator described there, two ball bearings are employed to provide positive coupling of the rotor shaft with the fan wheel. The ball bearings are placed next to one another on the rotor shaft. The outer rings of these ball bearings are fitted into a bore of a hub formed, by casting, together with the fan wheel. The first outer ring, which is near the cup-shaped bearing plate of the alternator, is firmly fixed by a press-fit into the hub, while the other outer ring of the ball bearing, which is closer to the belt pulley, is able to slip in the bore of the hub when there is a difference in rotational speed between the rotor shaft and the fan wheel. It has been found, however, that for those materials usually employed in the casting of the fan wheel, the sliding friction causes the outlying ball bearing to loosen in the hub after a relatively short time period. This leads to unpredictable coupling torques.

The speed versus torque characteristic of the fan wheel and the drive is illustrated in FIG. 9, in which the abscissa represents speed of the shaft of the alternator, and the ordinate, torque. As the shaft starts to rotate, the fan wheel of the alternator will be carried along by the friction torque of the bearings. Upon increase of speed, the fan speed gradually also increases. If the speed n of the alternator shaft remains low, the fan wheel, shortly thereafter, will also reach essentially the same speed. Up to a maximum value, which, in general, is determined by spring loading due to construction of the bearings, the fan wheel will rotate synchronously with the shaft of the alternator. The limiting speed of this synchronous rotation is shown in FIG. 9 at $n_1$, and is generally determined by the essentially constant torque $M_K$ which is necessary to overcome the friction within the bearings. If the speed of the alternator shaft increases above the value $n_1$, the speed of the fan wheel should not increase essentially. FIG. 9 illustrates the torque $M_K$ necessary to overcome bearing friction, which is essentially independent of speed, and the torque $M_L$, which is required to drive the fan wheel. At the above-referred limiting speed $n_1$ and at torque $M_1$, the two torques $M_K = M_L = M_1$, that is, the torques are equal. Thus, at the speed of $n_1$, synchronous operation between the alternator shaft and the fan wheel is obtained. At higher speeds, the operation is asynchronous.

The fan wheel should not rotate in synchronism with the alternator shaft throughout its speed range. Internal combustion (IC) engines have widely varying speed ranges. Operating the fan at a lower speed has the advantage that the lifetime thereof, as well as the lifetime of the bearings, is substantially increased, since wear and tear is reduced. By not driving the fan with the highest speeds of which the alternator can be driven, the drive power of the fan likewise is reduced, which increases the overall efficiency of the IC engine operation. Keeping the speed of the fan wheel at a level below maximum speed thus results in saving energy. Additionally, since customarily the alternators are driven by a V-belt, the belt itself will have a longer lifetime. The noise level is reduced. Due to the decreased acceleration required, loading on the V-belt and on the engine likewise is reduced. The speed of movement of the fan to move the air required to cool the generator is usually substantially less than the maximum speed at which the fan would rotate if it were directly coupled to the shaft.

THE INVENTION

It is an object of the present invention to provide an alternator of the above type with the fan wheel coupled in an effective, non-slipping manner to the rotor shaft, in which the coupling will have high durability and which will preserve the coupling torque originally set.

Briefly, two ball bearings are used to provide the positive, non-slipping coupling. One of the ball bearings is set into the fan wheel by a press-fit, while the other ball bearing has its outer race coupled by a spring element to the fan wheel. By tightening a nut on the shaft against the inner race of the outer bearing, a force is exerted which elastically deforms the spring element. A coupling torque will result between the rotor shaft and the fan wheel, due to the canting or inclination of the rolling planes of the balls in the ball bearing with respect to a plane transverse to the shaft axis.

BRIEF DESCRIPTION OF THE DRAWINGS

FIGS. 2 to 8 each show an axial half section of different embodiments for the coupling, with the belt pulley omitted and the fan wheel shown broken away.

DETAILED DESCRIPTION

Figure 1:
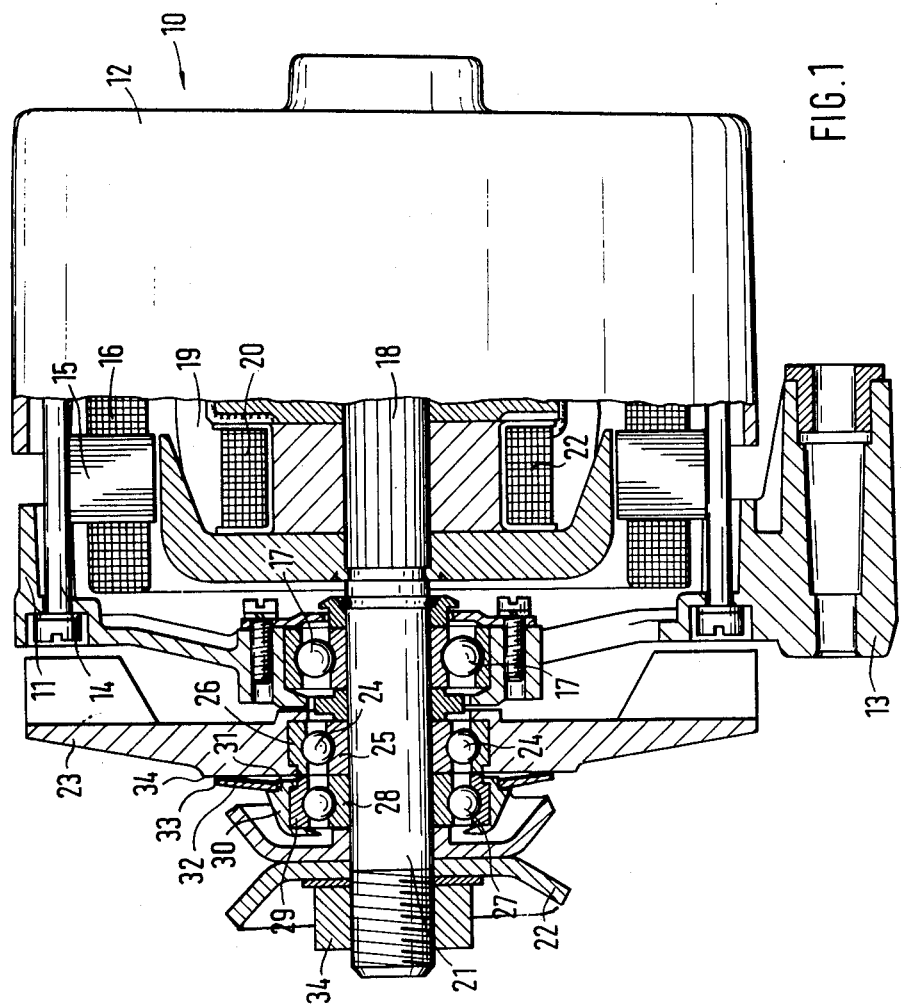
FIG. 1 shows a longitudinal side view of a three-phase alternator, partially cut-away in an axial longitudinal section.

The three-phase alternator 10 shown in FIG. 1 has a cup-shaped bearing plate 11 close to the drive side end and a bearing plate 12 closing off the other end, and covering the slip-rings (not shown). Support arm 13 is attached to the bearing plate 11. Armature lamination stack 15 is clamped between both bearing plates by screws 14, and supports on its circumference an evenly distributed three-phase armature 16. A ball bearing 17 is located in the plate 11 near the drive side. Together with a second ball bearing, which is not shown, in the bearing plate 12 remote from the drive side, it serves as the bearing of the rotor shaft 18. Rotor shaft 18 supports a claw pole rotor 19 inside the alternator housing, as well as an exciter or field winding 20, which is surrounded by the claw pole rotor 19. The end section of the rotor shaft 21, which projects outside of the bearing plate 11, is driven by V-belt pulley 22 by an internal combustion engine, not shown. Close to the drive side of the bearing plate 11, fan wheel 23 is rotatably mounted on rotor shaft 18, by ball bearing 24 located on the end section of the rotor shaft 21. The inner and outer races of ball bearing 24 are shown as 25 and 26, respectively.

In accordance with the invention, as shown in the embodiment of FIG. 1, a torque coupling arrangement is provided, which includes an outlying ball bearing 27. Bearing 27 is placed between the fan wheel 23 and the V-belt pulley 22. Ball bearing 27 has an inner ring 28 which is secured against rotation on the end section of the rotor shaft 21. The associated outer ring 29 is press fitted in a hub 30 having a short axial extension 31 with a circumferential groove defining an axial shoulder. A slightly conical shaped disc spring 32 is set into this groove and abuts with its outer rim 33 against the disc-shaped frontal surface 34 of the fan wheel.

By means of a nut 34', which is screwed on the threaded section of the end section of the rotor shaft 21, V-belt pulley 22 and the inner rings 28 and 25, which are all located on the shaft 18, can be pressed against each other and against the ball bearing 17. This results in an elastic bias of the disc spring 32, which acts to push away the outer ring 29 from the fan wheel 23. The coupling torque thus produced increases directly with the level of the bias, and results in an increase of the speed of rotation with which the fan wheel 23 can be driven.

The advantage of this arrangement is that by choosing the characteristics and/or dimension of the disc spring 32, a limiting value of the bias can be determined which will maintain the coupling torque at varying operation conditions.

In FIGS. 2 to 8, elements similar to those employed in the embodiment shown in FIG. 1 are given the same numbers as in FIG. 1 and will not be described again.

Embodiment of FIG. 2: two spring washers 32 and 36 are provided, which are elastically biased as in FIG. 1.

The spring force F', exerted by the spring washers 32 and 36, result in a deformation of the plane of the rolling contacts of the inner and outer ball bearings, as indicated by the lines AB and A'B' for the ball bearings 28 and 25 respectively. The spring force increases the coupling torque between the inner and outer rings in direct proportion to the spring force F'.

Embodiment of FIG. 3: the spring force is provided by corrugated, ring-shaped spring washers 38, which are set in a ring-shaped groove 39 in hub 30 and are pressed against the frontal surface 39 of fan wheel 23.

Embodiment of FIG. 4: the ring-shaped outer zone 40, of the disc formed on hub 30 with an axial offset, acts as a spring and exerts the spring force F' when the nut 34' is tightened, thereby pressing on the inner ring 28 via the washer 41. The outer rings 29 and 26 are located, respectively, with a press fit in the hub 30 and in the fan wheel 23. The facing sides of the outer rings 29 and 26 are formed with a groove 42, cut by turning on a lathe, resulting in two shoulders, 43 and 44, respectively. Two projections 45 and 46, of the hub 30 and the fan wheel 23, respectively, press against the respective shoulders 43 and 44, preventing the shifting of the outer ring 26,29 in the axial direction.

Embodiment of FIG. 5: a disc-shaped edge zone 40 is formed on the hub 30 as in the embodiment of FIG. 4. This edge zone 40 is bent backwards against the fan wheel 23 and the rotor shaft 18, and is riveted to the fan wheel 23 with a passthrough rivet 47.

Embodiment of FIG. 6 is a further development of the embodiment of FIG. 5, in which a ring 49, made of rubber or elastic synthetic material, is inserted between the edge zone 40 and the facing side of the fan wheel 23. The elastic ring 49 acts as a seal and also acts to dampen oscillations.

Embodiment of FIG. 7: an O-ring 50 is placed in an appropriate ring-shaped groove 51. The ring-shaped projection 40 of the hub 30 is axially offset at the edge zone 52 and is attached to the fan wheel 23 by rivet 47.

Figure 8:
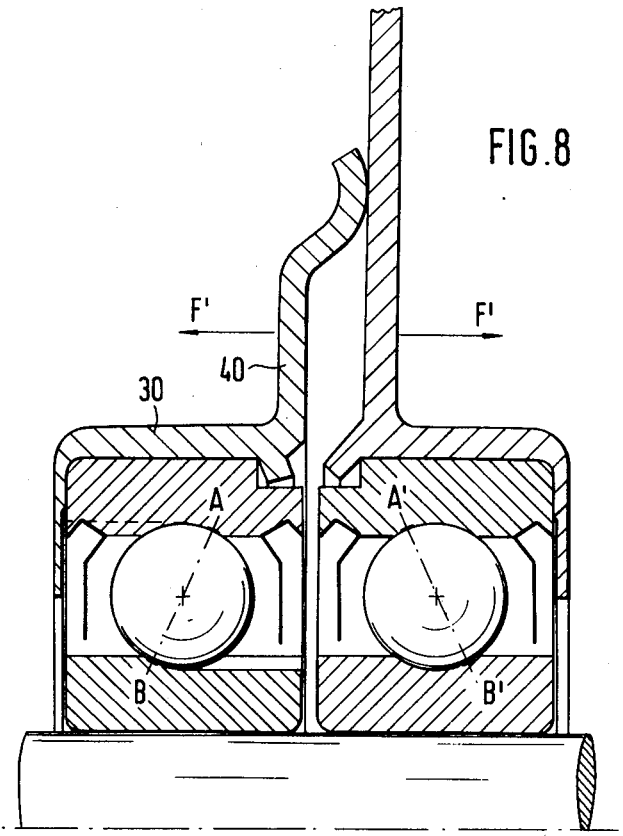
Figure 9:
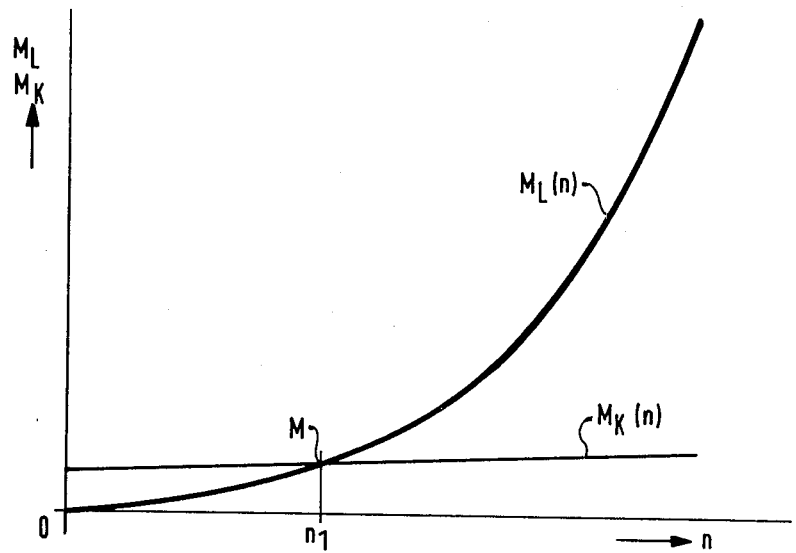
FIG. 9 is a speed torque graph.

Embodiment of FIG. 8: the ring or washer-shaped edge zone 40 of hub 30 is utilized as a spring washer. When nut 34' is tightened, edge zone 40 is elastically deformed and exerts spring force F'.

Various changes and modifications may be made, and features described in connection with any one of the embodiments may be used with any of the others, within the scope of the inventive concept.

I claim:

1. A three-phase alternator adapted to be driven by an internal combustion engine at variable speeds, comprising:
   a V-belt pulley (22);
   a rotor shaft (18,21) to which said V-belt pulley (22) is joined firmly to rotate together with the rotor shaft;
   a fan wheel (23), driven by the V-belt pulley (22) by a force-transmitting coupling, including
   a hub for holding a ball bearing internally thereof;
   means for axially resiliently connecting said hub to said fan wheel;
   two ball bearings, each having an inner ring (25,28), an outer ring (26,29), and interposed rolling balls (24,27);
   the inner ring (24) of the first one of said ball bearings (24,25,26) being seated on the shaft (18,21);
   the outer ring (26) of said one ball bearing being fitted into the fan wheel;
   the inner ring (28) of the second ball bearing (27,28,29) being seated on the shaft (28,21);
   the outer ring (29) of the second ball bearing (27,28,29) being seated in said hub;
   and adjustable means (34) for bearing against said inner ring (20) of said second ball bearing (27,28,29) for producing a predetermined bias force, through said bearings, for said axially resilient connecting means.

2. An alternator according to claim 1, wherein said axially resilient connecting means are constituted as an annular disc spring (32,36).

3. An alternator according to claim 2, wherein the disc spring (32,36) is engaged in a groove (42,43,44) of the outer ring (29).

4. An alternator according to claim 1, wherein said axially resilient connecting means are constituted as a corrugated spring washer.

5. An alternator according to claim 1, wherein said hub (30) has a flange-like extension edge zone (40) which abuts spring-elastically against the fan wheel (23) and thereby constitutes said axially resilient connecting means.

6. An alternator according to claim 5, wherein the edge zone (40) is disc-shaped (FIGS. 4–8) and is formed with an axial offset.

7. An alternator according to claim 5, wherein the edge zone (40) is bent over backwards (FIGS. 5 and 6) against the rotor shaft (18,21).

8. An alternator according to claim 6, wherein the edge zone (40) is attached to the fan wheel (23).

9. An alternator according to claim 1, including means for radially securely positioning the outer ring of the second ball bearing (27,28,29) in said hub (30), comprising:
   a groove or recess, formed in the outer ring defining an abutment or shoulder (43), and a projection (45) formed on the hub (30), fitting into the groove and pressing against the abutment.

* * * * *